(12) United States Patent  (10) Patent No.: US 8,296,771 B2
Gipp  (45) Date of Patent: Oct. 23, 2012

(54) SYSTEM AND METHOD FOR MAPPING BETWEEN RESOURCE CONSUMERS AND RESOURCE PROVIDERS IN A COMPUTING SYSTEM

(75) Inventor: Stephan Kurt Gipp, Inver Grove Heights, MN (US)

(73) Assignee: Cray Inc., Seattle, WA (US)

( * ) Notice: Subject to any disclaimer, the term of this patent is extended or adjusted under 35 U.S.C. 154(b) by 2054 days.

(21) Appl. No.: 10/643,740

(22) Filed: Aug. 18, 2003

(65) Prior Publication Data

US 2005/0044547 A1  Feb. 24, 2005

(51) Int. Cl.
 G06F 9/46 (2006.01)
 G06F 15/173 (2006.01)
(52) U.S. Cl. .................... 718/104; 709/223; 709/226
(58) Field of Classification Search .......... 718/100–108, 718/1; 713/1; 709/203, 223–226
See application file for complete search history.

(56) References Cited

U.S. PATENT DOCUMENTS

| | | | | |
|---|---|---|---|---|
| 4,849,877 | A * | 7/1989 | Bishop et al. ................. | 709/226 |
| 5,421,011 | A * | 5/1995 | Camillone et al. ............ | 718/104 |
| 6,058,414 | A * | 5/2000 | Manikundalam et al. .... | 718/104 |
| 6,247,041 | B1 * | 6/2001 | Krueger et al. ............... | 718/104 |
| 6,516,350 | B1 * | 2/2003 | Lumelsky et al. ............ | 709/226 |
| 6,763,454 | B2 * | 7/2004 | Wilson et al. ................. | 713/1 |
| 6,871,221 | B1 * | 3/2005 | Styles .......................... | 709/221 |
| 7,035,930 | B2 * | 4/2006 | Graupner et al. ............. | 709/226 |
| 7,039,705 | B2 * | 5/2006 | Graupner et al. ............. | 709/226 |
| 7,054,934 | B2 * | 5/2006 | Graupner et al. ............. | 709/226 |
| 7,058,947 | B1 * | 6/2006 | Raja et al. .................... | 718/104 |
| 7,069,558 | B1 * | 6/2006 | Stone et al. ................... | 718/104 |
| 7,111,297 | B1 * | 9/2006 | Sankaranarayan et al. ... | 718/104 |
| 7,137,119 | B1 * | 11/2006 | Sankaranarayan et al. ... | 718/103 |
| 7,155,515 | B1 * | 12/2006 | Brown et al. ................. | 709/226 |
| 7,178,147 | B2 * | 2/2007 | Benhase et al. .............. | 718/104 |

(Continued)

FOREIGN PATENT DOCUMENTS

WO  WO 03/038545 A2 *  5/2003

OTHER PUBLICATIONS

"Application Software Considerations for NUMA-Based Systems", microsoft.com/whdc/system/platform/server/datacenter/numa_isv.mspx, (Mar. 5, 2003), 6 pgs.

(Continued)

Primary Examiner — Jennifer To
(74) Attorney, Agent, or Firm — Charles A. Lemaire; Lemaire Patent Law Firm, P.L.L.C.

(57) ABSTRACT

A system and method for allocating system resources is described herein. In one embodiment, the method comprises creating, in a computer system, a resource consumer and assigning the resource consumer one of a set of flavors. The method further includes determining whether the resource consumer is limited to receiving resources from a certain one of a set of resource providers, wherein each of the set of resource providers has one of the set of flavors. The method further includes marking a field to indicate that the resource consumer is limited to receiving resources from the certain one of the set of resource providers, if the resource consumer is limited to receiving resources from the certain one of the set of resource providers. The method further includes allocating a resource to the resource consumer from one of the set of resource providers whose flavor matches the flavor assigned to the resource consumer.

16 Claims, 7 Drawing Sheets

U.S. PATENT DOCUMENTS

| | | | | |
|---|---|---|---|---|
| 7,203,943 B2* | 4/2007 | Shaffer | | 718/104 |
| 7,219,347 B1* | 5/2007 | Waddington | | 718/104 |
| 7,222,343 B2* | 5/2007 | Heyrman et al. | | 718/100 |
| 7,254,813 B2* | 8/2007 | Leong et al. | | 718/104 |
| 7,340,522 B1* | 3/2008 | Basu et al. | | 709/226 |
| 2003/0084085 A1* | 5/2003 | Breidenbach et al. | | 709/1 |
| 2003/0084088 A1* | 5/2003 | Shaffer | | 709/104 |
| 2003/0236822 A1* | 12/2003 | Graupner et al. | | 709/203 |
| 2004/0045001 A1* | 3/2004 | Bryant | | 718/100 |
| 2004/0073673 A1* | 4/2004 | Santos et al. | | 709/226 |
| 2004/0143833 A1* | 7/2004 | Heyrman et al. | | 718/100 |
| 2004/0194098 A1* | 9/2004 | Chung et al. | | 718/100 |
| 2008/0022286 A1* | 1/2008 | Chung et al. | | 718/104 |

OTHER PUBLICATIONS

"Hptc/ClusterPack V2.0 1.8 Workload Management Tasks", *High Performance Technical Computing (hptc) Solutions*, web.archive.org/web/20030727110012/hp.com/techservers/clusterpack-v2/1.8.html, (Jul. 1, 2003), 7 pgs.

"International Search Report for PCT Application No. PCT/US2004/026675", (Aug. 30, 2005), 4 pgs.

"NAS Origin2000 Configuration for Batch Job Execution", enusf.anu.edu.au/{dbs900/PBS/02K/02K-config.html, (Mar. 20, 2000), 7 pgs.

Jackson, P., "Process Scheduling and Memory Placement—Design Notes", sourceforge.net/docman/display_doc.php?docid=8563&group_id=8875, (Jul. 2, 2001), 6 pgs.

"International Preliminary Report on Patentability and Written Opinion of the International Searching Authority for corresponding PCT Application No. PCT/US2004/026675", (Feb. 21, 2006), 5 pgs.

"European Application Serial No. 04781381.1, Office Action mailed May 25, 2007", 5 pgs.

"European Application Serial No. 04781381.1, Office Action mailed Jun. 28, 2010", 7 pgs.

"European Application Serial No. 04781381.1, Response filed Jan. 10, 2011 to Office Action mailed Jun. 28, 2010", 10 pgs.

"European Application Serial No. 04781381.1, Response filed Nov. 28, 2007 to Office Action mailed May 25, 2007", 16 pgs.

"International Application Serial No. PCT/US2004/026675, International Search Report mailed Aug. 30, 2005", 7 pgs.

"International Application Serial No. PCT/US2004/026675, Written Opinion mailed Aug. 30, 2005", 4 pgs.

* cited by examiner

United States Patent — US 8,296,771 B2

SYSTEM AND METHOD FOR MAPPING BETWEEN RESOURCE CONSUMERS AND RESOURCE PROVIDERS IN A COMPUTING SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to multiprocessor computer systems and more specifically allocating resources in multiprocessor computer systems.

BACKGROUND

As computer performance demands increase, multiprocessor computer systems are becoming more popular. Some popular multiprocessor architectures include nodes, which include multiple central processing units (CPUs) and multiple physical memory units. For software executing on such a multiprocessor system, the multiple physical memory units appear as one large physical memory address space. When memory is distributed over a number of nodes, system performance can vary because software processes can be assigned memory addresses on different nodes. Typically, CPUs can access local memory locations much faster than remote memory locations. Therefore, to increase system performance, it is often preferable to allocate local memory to software running on a local CPU. However, allocating remote memory may be preferable when there is not sufficient local memory available for executing high-priority software processes.

Some prior art multiprocessor systems provide highly flexible memory allocation schemes that allow certain physical memory segments to be allocated to specific nodes (or processors), while allowing other physical memory segments to be allocated to any node (or processor). These highly flexible memory allocation schemes often do not abstract memory allocation details from software designers, making software design relatively complicated. Moreover, these highly flexible memory systems often require software to be redesigned when nodes are added or removed from the multiprocessor system.

SUMMARY

A system and method for allocating system resources is described herein. In one embodiment, the method comprises creating, in a computer system, a resource consumer and assigning the resource consumer one of a set of flavors. The method further includes determining whether the resource consumer is limited to receiving resources from a certain one of a set of resource providers, wherein each of the set of resource providers has one of the set of flavors. The method further includes marking a field to indicate that the resource consumer is limited to receiving resources from the certain one of the set of resource providers, if the resource consumer is limited to receiving resources from the certain one of the set of resource providers. The method further includes allocating a resource to the resource consumer from one of the set of resource providers whose flavor matches the flavor assigned to the resource consumer.

In one embodiment, the apparatus includes a first set of one or more nodes, wherein each of the set of nodes includes, a second set of one or more central processing units (CPUs). The apparatus further includes a physical memory communicatively coupled to each CPU of the second set, wherein the physical memory includes a first flavor of the node, wherein the physical memory includes an operating system, and wherein the operating system is to allocate CPUs of the second set and the physical memory to resource consumers that have a second flavor that matches the first flavor.

BRIEF DESCRIPTION OF THE FIGURES

The present invention is illustrated by way of example and not limitation in the Figures of the accompanying drawings.

DESCRIPTION OF THE EMBODIMENTS

In the following description, numerous specific details are set forth. However, it is understood that embodiments of the invention may be practiced without these specific details. In other instances, well-known circuits, structures, and techniques have not been shown in detail in order not to obscure the understanding of this description. Note that in this description, references to "one embodiment," "an alternative embodiment," or the like mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

Hardware and Operating Environment

This section provides an overview of the exemplary hardware and the operating environment in which embodiments of the invention can be practiced.

Figure 1:
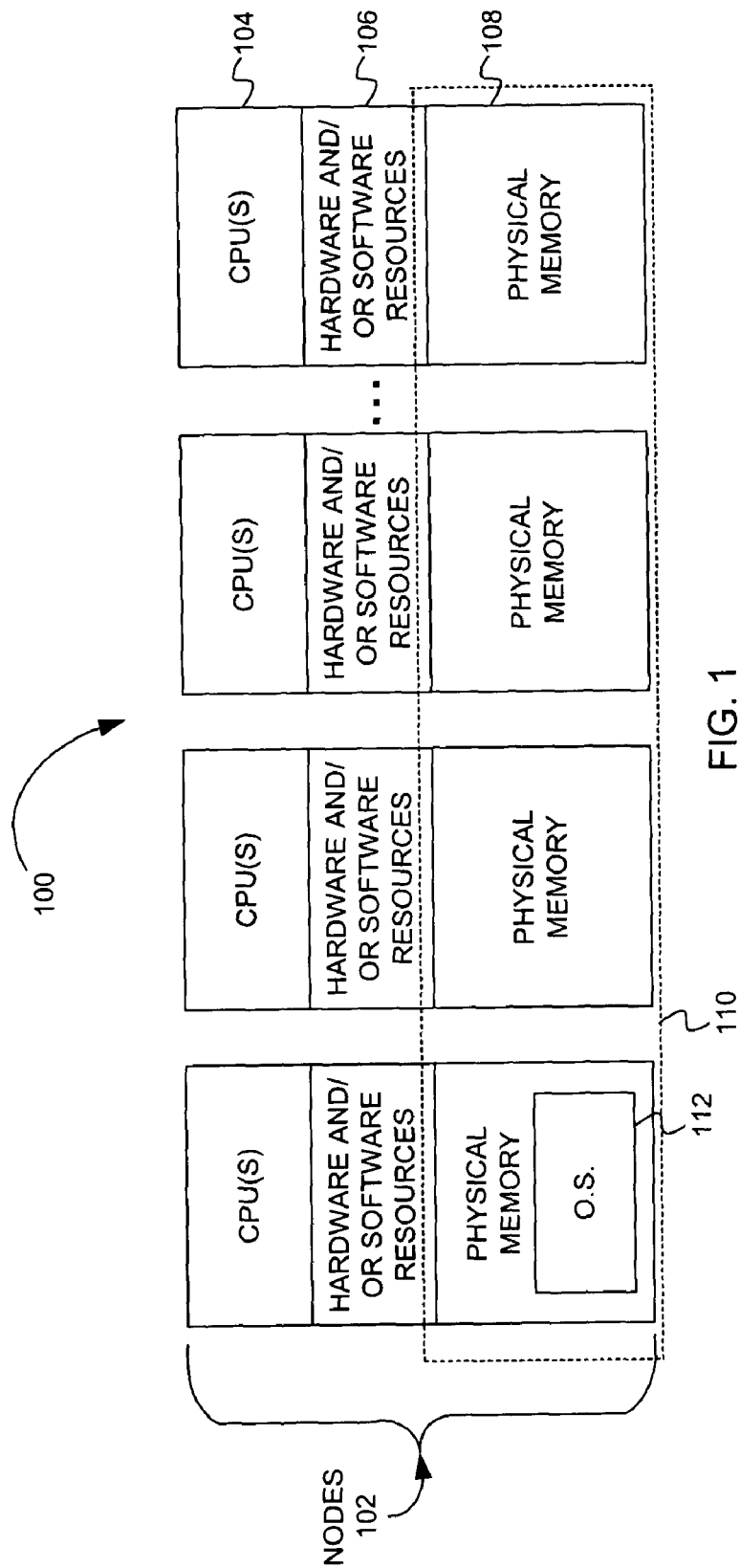
FIG. 1 is a block diagram illustrating an exemplary computer system used in conjunction with embodiments of the invention.

FIG. 1 is a block diagram illustrating an exemplary computer system used in conjunction with embodiments of the invention. As shown in FIG. 1, the multiprocessor computer system 100 includes a number of nodes 102. As shown in FIG. 1, each node 102 includes one or more central processing units 104 (illustrated as CPU(s) 104), hardware and/or software resources 106, and physical memory 108. In one embodiment, the hardware and/or software resources 106 include communication channels, device drivers, secondary storage, etc. Alternative embodiments call for other various hardware and/or software resources.

As shown in FIG. 1, the physical memory 108 of one or more nodes 102 includes an operating system 112 (illustrated as O.S. 112). In one embodiment, the operating system 112 is software used for performing operations according to embodiments of the invention. Software is machine-readable media for performing operations according to embodiments of the invention. Machine-readable media includes any mechanism that stores information in a form readable by a machine (e.g., a computer). For example, a machine-readable medium includes read only memory (ROM), random access memory (RAM), magnetic disk storage media, optical storage media, and flash memory devices.

In the computer system 100, the physical memories of all the nodes are combined to form a single logical memory address space 110. In embodiment, the physical memory 108 includes random access memory and cache memory. Because the computer system 100 has a single logical memory address space, software running on one node could be allocated memory from a different node, as described in greater detail below.

Exemplary Implementation

Figure 2:
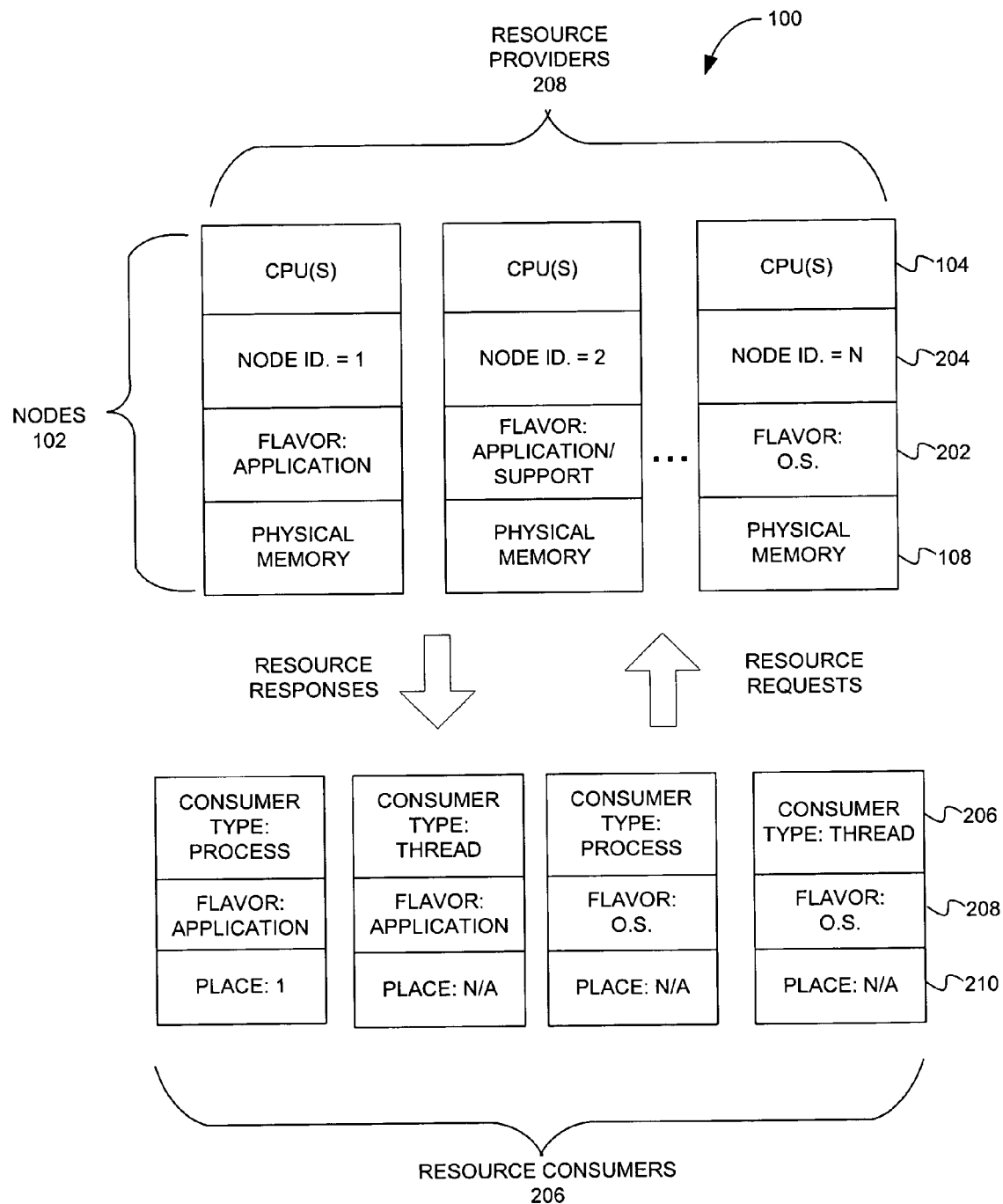
FIG. 2 is a data flow diagram illustrating a flow of resource requests and responses, according to exemplary embodiments of the invention.

FIG. 2 is a data flow diagram illustrating a flow of resource requests and responses, according to exemplary embodiments of the invention. As shown in FIG. 2, the computer system 100 includes a set of resource consumers 206 and a set of resource providers 208. As shown in FIG. 2, the resource consumers 206 transmit resource requests to, and receive resource responses from, the resource providers 208. Similarly, the resource providers 208 transmit resource responses to, and receive resource requests from, the resource consumers 206. As also shown in FIG. 2, each of the nodes 102 includes CPU(s) 104 and physical memory 108, as described above. Additionally, each node 102 also includes a node identifier field 204 (illustrated as NODE ID. 204) and a flavor field 202. As shown in FIG. 2, each resource consumer 206 includes a consumer type field 206, a flavor field 208, and a place field 210.

In one embodiment, there are two consumer types: 1) process and 2) thread. A process is a set of instructions that resides in an allocated portion of physical memory, while a thread is an execution path (or trace) of a set of instructions, wherein the execution occurs on a CPU. In one embodiment, processes request physical memory and threads request CPUs. Alternative embodiments of the invention call for additional various consumer types such as I/O consumers, storage consumers, communication channel consumers, etc.

In one embodiment, there are three flavors including: 1) application, 2) support, and 3) O.S. Alternative embodiments, call for a greater or lesser number of flavors. In one embodiment, application-flavored resource consumers (e.g., processes and threads) are associated with application programs such as weather forecasting programs. Support-flavored are associated with shells, scripts, etc., while resource consumers of the OS-flavor are associated with operating system programs. In one embodiment, resource providers (e.g., nodes) can be assigned multiple flavors. For example, a node can be assigned both application and support flavors. However, in one embodiment, resource consumers can only be assigned one flavor. In one embodiment, resource providers can provide resources only to resource consumers that have a matching flavor. For example, an application-flavored node can only provide physical memory and CPU(s) to application-flavored resource consumers. Moreover, an application-flavored node cannot provide physical memory and CPUs to OS and support-flavored resource consumers.

In one embodiment, the place field 210 indicates the only node 102 from which a resource consumer can acquire resources. In one embodiment, if the place field 210 is not assigned a value, the place field 210 is not used in determining whether resources can be acquired from a given node, as described in greater detail below. In one embodiment, the value stored in the place field 210 corresponds to a node identifier 204 stored in one of the nodes.

Figure 3:
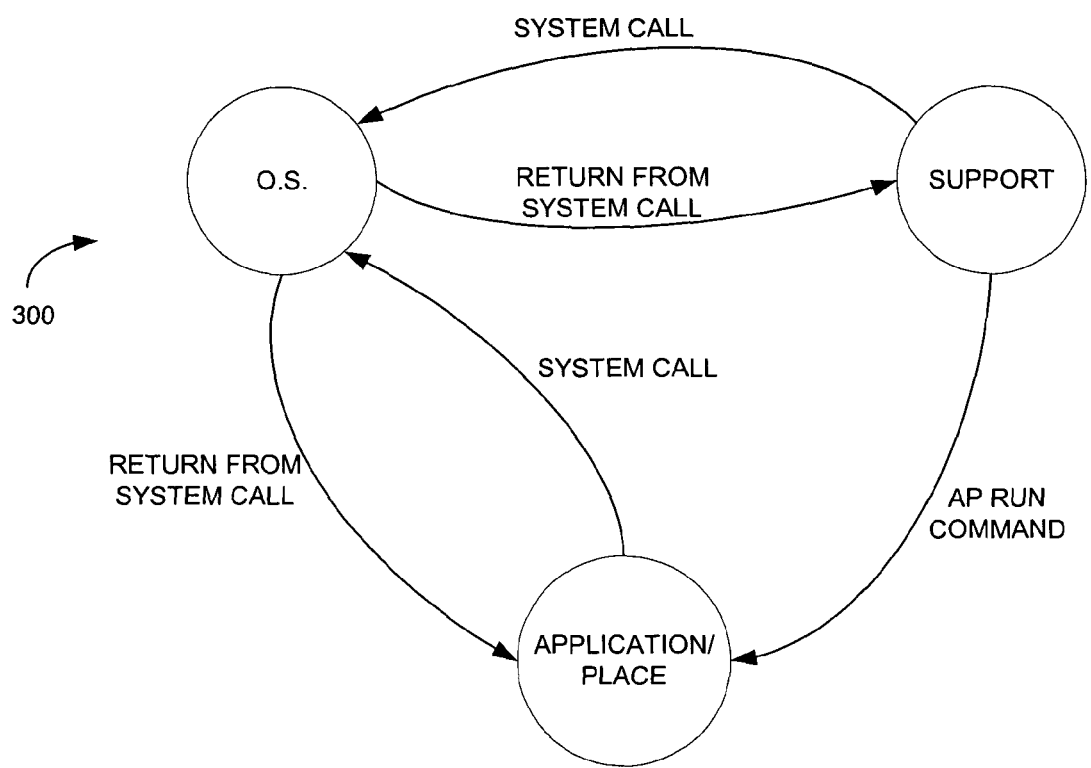
FIG. 3 is a state machine illustrating dynamic flavor changes, according to exemplary embodiments of the invention.

FIG. 3 is a state machine illustrating dynamic flavor changes, according to exemplary embodiments of the invention. In one embodiment, resource consumers 206 can dynamically change flavors based on conditions within the multiprocessor computer system 100. The state machine 300 illustrates conditions under which resource consumers dynamically change flavors.

As shown in FIG. 3, the state machine 300 is a cyclic directed graph including three nodes (illustrated as circles), where each node is a state. The three states, which correspond with resource flavors, are O.S., SUPPORT, and APPLICATION/PLACE. As shown in FIG. 3, the three states are connected by a series of the directed edges (i.e., arrows), wherein each directed edge has an associated condition. For example, the conditions for the two directed edges leading into the O.S. state are "system call," while the two directed edges leading out of the O.S. state are "return from system call." Moreover, the condition associated with the directed edge leading into the APPLICATION/PLACE state is "AP Run a.out." The "system call" condition can occur when a system call is executed during the execution of a support-flavored or application-flavored thread. The return from system call condition can occur when an OS-flavored thread completes execution of a system call. The AP Run a.out condition can occur when a support-flavored thread executes an AP Run a.out command.

The state machine 300 begins at any of the states and moves to other states when the various conditions are satisfied, illustrating how resource consumers (e.g., threads) can dynamically change flavors. For example, the state changes (indicating a flavor change) from SUPPORT to O.S. when a system call is made. As another example, the state changes from SUPPORT to APPLICATION/PLACE when an "AP Run a.out command" is executed.

Figure 4:
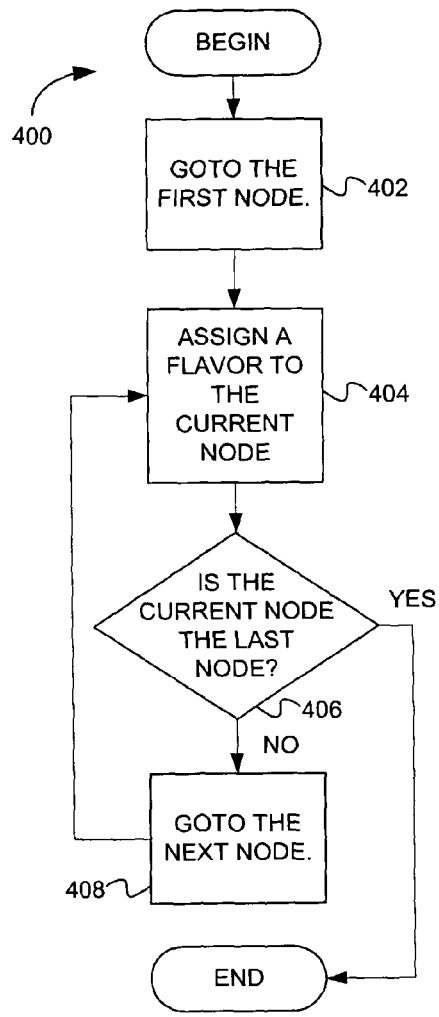
FIG. 4 is a flow diagram illustrating operations performed by an administrator for assigning node flavors, according to exemplary embodiments of the invention.
Figure 5:
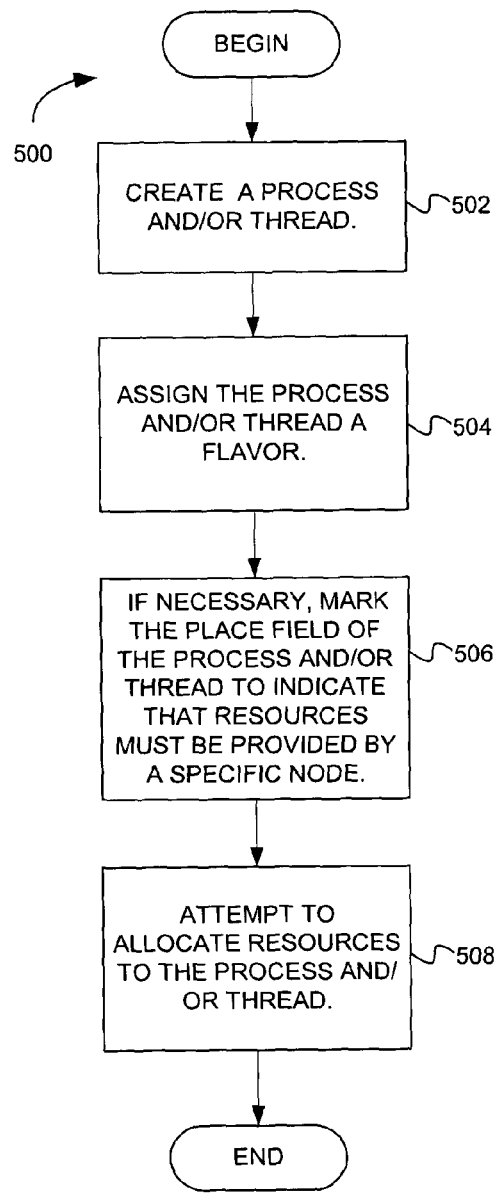
FIG. 5 is a flow diagram illustrating operations were allocating system resources, according to embodiments of the invention.
Figure 6:
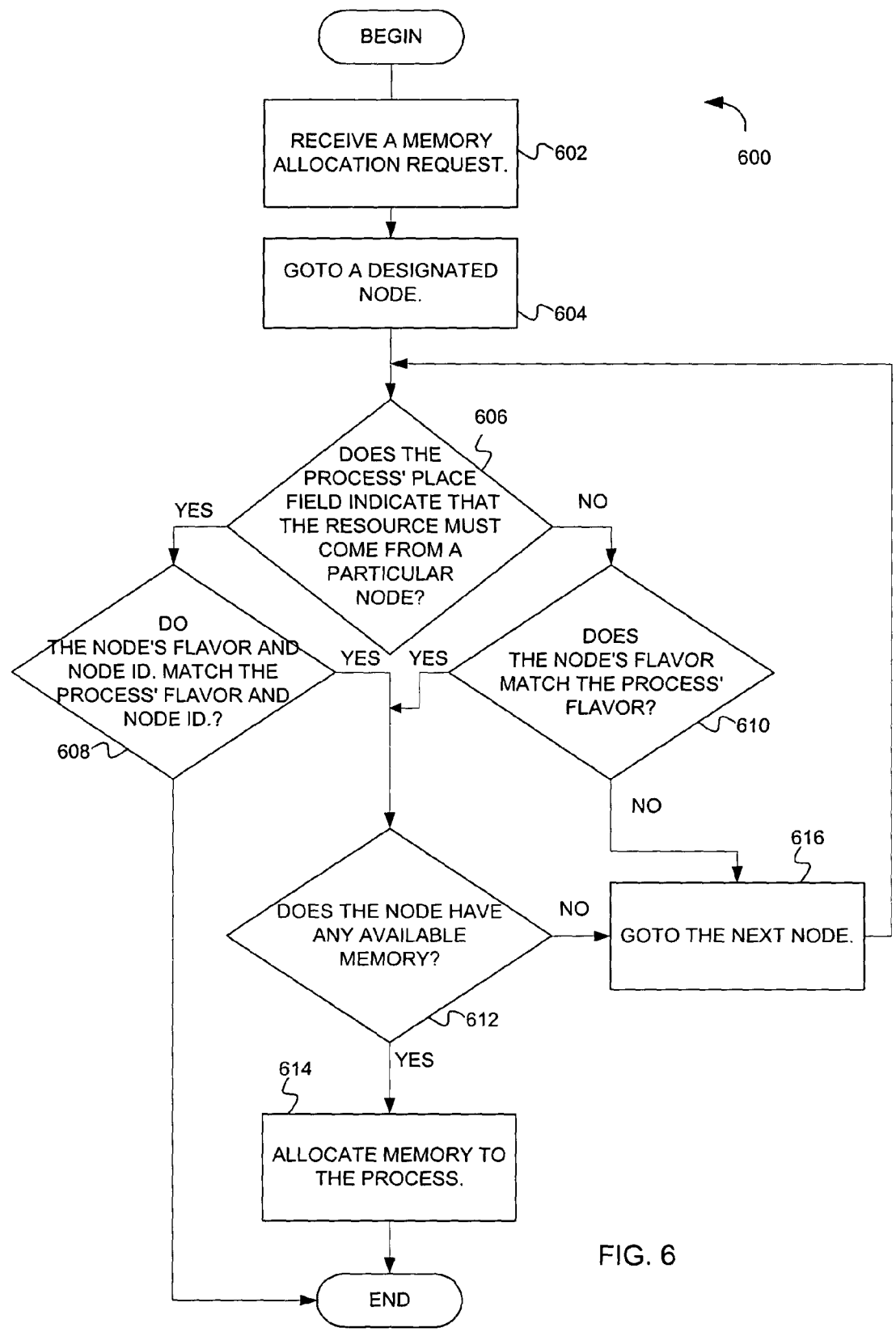
FIG. 6 is a flow diagram illustrating operations for allocating memory to resource consumers based on a flavoring system, according to exemplary embodiments of the invention.
Figure 7:
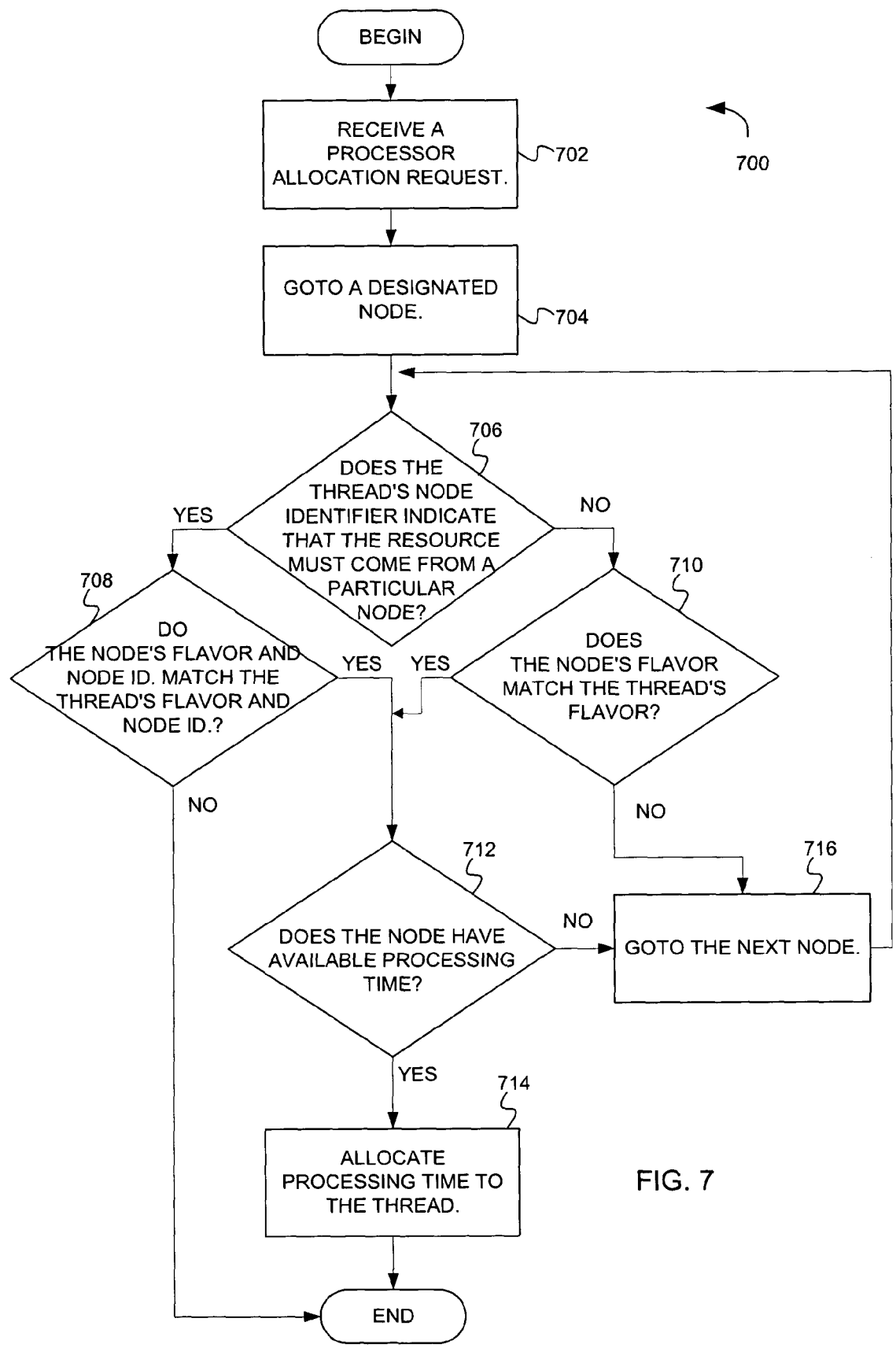
FIG. 7 is a flow diagram illustrating operations for allocating CPUs to resource consumers based on a flavoring system, according to exemplary embodiments of the invention.

While the discussion of FIGS. 2-3 above described the concepts of resource allocation and flavors, FIGS. 4-8 describe operations for assigning flavors and allocating resources. In particular, FIG. 4 describes a method for assigning node flavors and FIG. 5 describes general operations for allocating resources based on the rules about flavor described herein. FIGS. 6-7 describe operations for allocating memory and processors based on the flavor rules.

FIG. 4 is a flow diagram illustrating operations, performed by an administrator, for assigning node flavors, according to exemplary embodiments of the invention. The flow diagram 400 will be described with reference to the exemplary computer system of FIG. 1. The flow diagram 400 commences at block 402. At block 402, the first node is found. For example, using operating system software 112, an administrator goes to the first node. The process continues at block 404.

At block 404, a flavor is assigned to the current node. For example, an administrator assigns a flavor to the current node. As a more specific example, an administrator uses the operating system software 112 to make a support-flavored, OS-flavored, and/or application-flavored node. As noted above, in one embodiment, nodes can be assigned multiple flavors. The process continues at block 406.

As shown in block 406, it is determined whether the current node is the last node. For example, the administrator determines whether the current node is the last node to which a flavor is to be assigned. If the current node is the last node, the process ends. Otherwise, the process continues at block 408.

At block 408, the next node is found. For example, using the operating system software 112, the administrator goes to the next node. From block 408, the process continues at bought 404. Although the flow diagram 400 describes operations performed by an administrator, alternative embodiments call for an automated process performed by the operating system software 112. For example, in one embodiment, the operating system software 112 assigns each node a default flavor at boot-up.

FIG. 5 is a flow diagram illustrating operations for allocating system resources, according to embodiments of the invention. The flow diagram 500 will be described with reference to the exemplary embodiments of FIGS. 1 and 2. The flow diagram 500 commences at block 502, where a process and/or thread is created. For example, the operating system software 112 creates a process and/or thread. The flow continues at block 504.

At block 504, the process and/or thread is assigned a flavor. For example, the operating system software 112 assigns the process and/or thread a flavor. As a more specific example, the operating system software 112 marks the process' flavor field to indicate that it is a support-flavored, OS-flavored, or application-flavored process. The flow continues at block 506.

As shown in block 506, the place field of a process and/or thread is marked if necessary. For example, the operating system software 112 marks the place field of a process and/or thread if necessary. In one embodiment, the operating system software 112 marks the place field in processes that must achieve high performance. For example, a high-speed process stored in the physical memory of node 1 should only receive memory allocations from memory local to node 1 because remote memory (i.e., memory of other nodes) would cause slow execution speeds. The flow continues at block 508.

At block 508, an attempt is made to allocate resources to the process and/or thread. For example, the operating system software 112 attempts to allocate resources to the process and/or thread. The operations of block 508 are described in greater detail below, with reference to FIGS. 6-7. From block 508, the flow ends.

While the discussion of FIG. 5 above describes general operations for creating resource consumers (e.g., threads and processes) and allocating resources to those resource consumers, FIG. 6-7 describe specific operations for allocating memory and CPUs to resource consumers, based on the flavor system described above.

FIG. 6 is a flow diagram illustrating operations for allocating memory to resource consumers based on a flavoring system, according to exemplary embodiments of the invention. Flow diagram 600 will be described with reference to the exemplary embodiments of FIGS. 1-2. The flow diagram 600 commences at block 602.

At block 602, a memory allocation request is received from a process. For example, the operating system software 112 receives a memory allocation request from a process. The flow continues at block 604.

As shown in block 604, a designated node is found. For example, the operating system software 112 goes to a predetermined node to begin searching for available memory. In one embodiment, the predetermined node is referred to as the affinity node. In one embodiment, the operating system software 112 begins every search at the same node, while other embodiments begin searching at different nodes based on different conditions. For example, the operating system software 112 may begin searching different nodes based on the memory requestor's flavor. The flow continues at block 606.

As shown in block 606, it is determined whether the process' place field indicates that the process must receive resources from a particular node. For example, the operating system software 112 inspects the place field of the process to determine whether the process must receive resources from a particular node. If the place field indicates that the process must receive resources (e.g., memory allocations) from a particular node, the flow continues at block 608. Otherwise, the flow continues at block 610.

At block 608, it is determined whether the node's flavor and ID fields match the process' flavor and place fields. For example, the operating system software 112 compares the flavor and place fields of the process to the flavor and ID fields of the node. If the fields do not match, the flow ends. If the fields match, the flow continues at block 612.

At block 612, it is determined whether the node has any available memory. For example, the operating system software 112 determines whether the node has any available physical memory 108. If the node has memory available, the flow continues at block 614. Otherwise, the flow continues at block 616.

At block 614, memory is allocated to the process. For example, the operating system software 112 allocates a block of physical memory 108 to the process. From block 614, the flow ends.

At block 610, it is determined whether the node's flavor matches the process' flavor. For example, the operating system software 112 compares the node's flavor field with the process's flavor field. If the fields match, the flow continues at block 612. Otherwise the flow continues at block 616.

At block 616, the next node is found. For example, the operating system software 112 goes to another node to find the needed memory. In one embodiment, the operating system software 112 searches through the nodes sequentially (i.e., starting with node zero and preceding through the last node). In an alternative embodiment, the operating system software 112 finds the next node according to a search algorithm. For example, the operating system software 112 can use the nearest node algorithm. Alternatively, the operating system software 112 can perform a heuristic search for the node most likely to have the needed resources. From block 616, the process continues at block 606.

FIG. 7 is a flow diagram illustrating operations for allocating CPUs to resource consumers based on a flavoring system, according to exemplary embodiments of the invention. Flow diagram 700 will be described with reference to the exemplary embodiments of FIGS. 1-2. The flow diagram 700 commences at block 702.

At block 702, a processor allocation request is received from a thread. For example, the operating system software 112 receives a processor allocation request from a thread. The flow continues at block 704.

As shown in block 704, a designated node is found. For example, the operating system software 112 goes to a predetermined node to begin searching for available CPUs. In one embodiment, the predetermined node is referred to as the affinity node. In one embodiment, the operating system software 112 begins every search at the same node, while other embodiments begin searching at different nodes based on different conditions. For example, the operating system software 112 may begin searching different nodes based on the CPU requestor's flavor. The flow continues at block 706.

As shown in block 706, it is determined whether the thread's place field indicates that the thread must receive resources from a particular node. For example, the operating system software 112 inspects the place field of the thread to determine whether the thread must receive resources from a particular node. If the place field indicates that the thread must receive resources (e.g., CPUs) from a particular node, the flow continues at block 708. Otherwise, the flow continues at block 710.

At block 708, it is determined whether the node's flavor and ID fields match the thread's flavor and place fields. For example, the operating system software 112 compares the flavor and place fields of the thread to the flavor and ID fields of the node. If the fields do not match, the flow ends. If the fields match, the flow continues at block 712.

At block 712, it is determined whether the node has any available CPUs. For example, the operating system software 112 determines whether the node has any available CPU(s) 104. If the node has CPUs available, the flow continues at block 714. Otherwise, the flow continues at block 716.

At block 714, one or more CPUs is allocated to the thread. For example, the operating system software 112 allocates one or more CPU(s) 104 to the thread. From block 714, the flow ends.

At block 710, it is determined whether the node's flavor matches the thread's flavor. For example, the operating system software 112 compares the node's flavor field with the thread's flavor field. If the fields match, the flow continues at block 712. Otherwise the flow continues at block 716.

At block 716, the next node is found. For example, the operating system software 112 goes to another node to find the needed CPU. From block 716, the process continues at block 706.

The discussion of FIGS. 6-7 above describes operations for allocating resources to processes and threads. In particular, FIGS. 6-7 describe operations for determining where to needed resources can be found and which resources can be used. In contrast, FIG. 8 describes operations that resource consumers perform when requesting resources.

Figure 8:
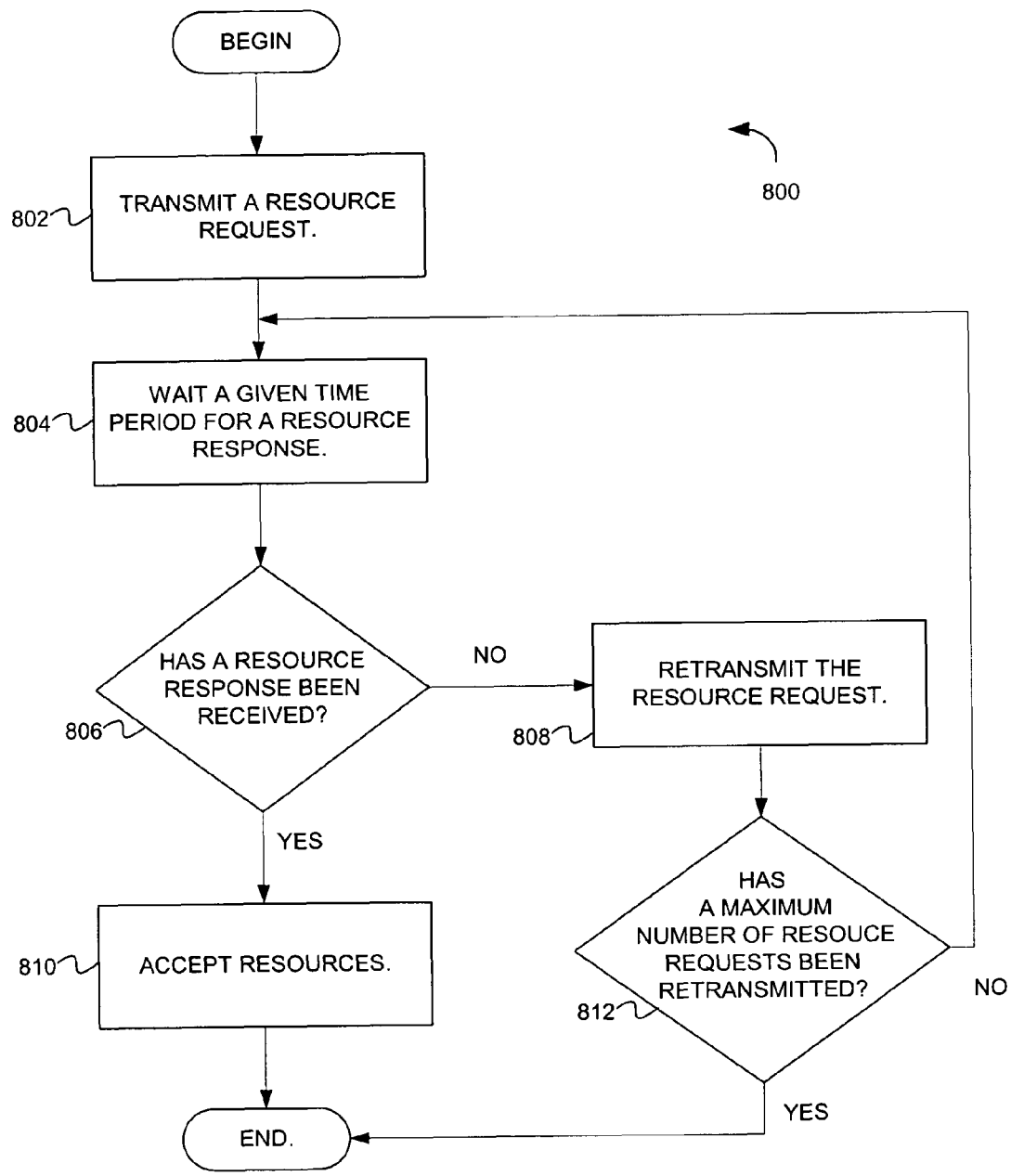
FIG. 8 is a flow diagram illustrating operations for requesting resources, according to exemplary embodiments of the invention.

FIG. 8 is a flow diagram illustrating operations for requesting resources, according to exemplary embodiments of the invention. The flow diagram 800 will be described with reference to the exemplary embodiments of FIGS. 1-2. The flow diagram 800 commences at block 802.

At block 802, a resource request is transmitted. For example, a resource consumer 206 transmits a resource request to a resource provider 208. The process continues at block 804. At block 804, a given period of time elapses while waiting for a resource response. For example, the resource consumer 206 waits a given time period to receive a resource response. The process continues at block 806.

At block 806, it is determined whether a resource response has been received. For example, the resource consumer 206 determines whether it has received a resource response from a resource provider 208. If a response has been received, the process continues at block 810. Otherwise, the process continues at block 808. As shown in block 808, the resource request is retransmitted. For example, the resource consumer 206 retransmits its resource request. The process continues at block 812.

At block 812, it is determined whether a maximum number of resource requests have been retransmitted. For example, the resource consumer 206 determines whether it has retransmitted the resource request a maximum number of times. If it has not retransmitted the resource request a maximum number of times, the process continues at block 804. Otherwise the process ends.

As shown in block 810, resources are accepted. For example, the resource consumer 206 accepts resources (e.g., CPUs, memory, etc.). From block 810, the process ends.

Thus, a system and method for performing TLB operations have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method that executes in a computing system having a plurality of resource consumers and a plurality of resource providers, the method comprising:

assigning two or more different first resource consumers of the plurality of resource consumers to a first consumer group name;

assigning two or more different second resource consumers of the plurality of resource consumers to a second consumer group name;

assigning two or more different first resource providers of the plurality of resource providers to a first provider group name;

assigning two or more different second resource providers of the plurality of resource providers to a second provider group name;

defining an intermediate mapping between the plurality of resource consumers and the plurality of resource providers using the consumer group names and the provider group names, wherein the intermediate mapping is expressed as a set of flavors, wherein the set of flavors includes application flavors, support flavors, and operating system flavors, and wherein the intermediate mapping associates the first resource consumers and the first resource providers with a first flavor and associates the second resource consumers and the second resource providers with a second flavor;

creating, in the computing system, a new resource consumer to execute a program, wherein creating includes assigning one of the flavors to the new resource consumer; and allocating a resource to the new resource consumer from one or more of the resource providers whose flavor matches the flavor assigned to the new resource consumer.

2. The method of claim 1, wherein the resource includes a physical memory.

3. The method of claim 1, wherein the plurality of resource providers provider includes one or more central processing units.

4. A computer-implemented system comprising:
- a plurality of resource consumers;
- a plurality of resource providers; and
- at least one processor operatively coupled to the plurality of resource consumers and the plurality of resource providers, where the at least one processor is configured to:
  - assign two or more different first resource consumers of the plurality of resource consumers to a first consumer group name;
  - assign two or more different second resource consumers of the plurality of resource consumers to a second consumer group name;
  - assign two or more different first resource providers of the plurality of resource providers to a first provider group name;
  - assign two or more different second resource providers of the plurality of resource providers to a second provider group name;
  - define an intermediate mapping between the plurality of resource consumers and the plurality of resource providers using the consumer group names and the provider group names, wherein the intermediate mapping associates the first resource consumers with the first resource providers and associates the second resource consumers with the second resource providers;
  - create, in the computer-implemented system, a new resource consumer to execute a program, wherein creating includes assigning one of the consumer group names to the new resource consumer; and
  - allocate a resource to the new resource consumer from one or more of the first resource providers, wherein allocating includes matching the consumer group name assigned to the new resource consumer to an associated provider group name as defined by the intermediate mapping.

5. The system of claim 4, wherein the plurality of resource providers includes at least one CPU.

6. The system of claim 4, wherein the resource includes a physical memory.

7. An apparatus comprising:
- memory to store a set of consumer group names and a set of provider group names, wherein the set of consumer group names include a first consumer group name and a second consumer group name and wherein the set of provider group names include a first provider group name and a second provider group name; and
- at least one processor communicatively coupled to a plurality of resource consumers and a plurality of resource providers, wherein the at least one processor is configured to:
  - assign two or more different first resource consumers of the plurality of resource consumers to the first consumer group name;
  - assign two or more different second resource consumers of the plurality of resource consumers to the second consumer group name;
  - assign two or more different first resource providers of the plurality of resource providers to the first provider group name;
  - assign two or more different second resource providers of the plurality of resource providers to the second provider group name;
  - define an intermediate mapping between the plurality of resource consumers and the plurality of resource providers using the consumer group names and the provider group names, wherein the intermediate mapping associates the first resource consumers with the first resource providers and associates the second resource consumers with the second resource providers, wherein the intermediate mapping is expressed as a set of flavors, and wherein the set of flavors includes an operating system flavor, a support flavor, or an application flavor;
  - create, in a computing machine, a new resource consumer to execute a program, and assign one of the consumer group names to the new resource consumer; and
  - allocate a resource to the new resource consumer from one or more of the first resource providers, and match the consumer group name assigned to the new resource consumer to an associated provider group name as defined by the intermediate mapping.

8. The apparatus of claim 7, wherein the at least one resource consumer comprises at least one of a process or a thread processes and threads.

9. A non-transitory machine-readable storage medium storing instructions, which when executed by a machine, cause the machine to perform operations comprising:
- assigning two or more different first resource consumers of a plurality of resource consumers to a first consumer group name;
- assigning two or more different second resource consumers of the plurality of resource consumers to a second consumer group name;
- assigning two or more different first resource providers of a plurality of resource providers to a first provider group name;
- assigning two or more different second resource providers of the plurality of resource providers to a second provider group name;
- defining an intermediate mapping between the plurality of resource consumers and the plurality of resource providers using the consumer group names and the provider group names, wherein the intermediate mapping associates the first resource consumers with the first resource providers and associates the second resource consumers with the second resource providers, wherein the intermediate mapping is expressed as a set of flavors, and wherein the set of flavors includes application flavors, support flavors, and operating system flavors;
- creating, in a computer system, a new resource consumer to execute a program, wherein creating includes assigning one of the consumer group names to the new resource consumer; and
- allocating a resource to the new resource consumer from one or more of the resource providers, wherein allocating includes matching the consumer group name assigned to the new resource consumer to an associated provider group name as defined by the intermediate mapping.

10. The machine-readable medium of claim 9, wherein the resource includes a physical memory.

11. The machine-readable medium of claim 9, wherein the plurality of resource providers includes one or more central processing units.

12. A method that executes in a computing system having a plurality of resource consumers and a plurality of resource providers, the method comprising:

assigning two or more different first resource consumers of the plurality of resource consumers to a first consumer group name;

assigning two or more different second resource consumers of the plurality of resource consumers to a second consumer group name;

assigning two or more different first resource providers of the plurality of resource providers to a first provider group name;

assigning two or more different second resource providers of the plurality of resource providers to a second provider group name;

defining an intermediate mapping between the plurality of resource consumers and the plurality of resource providers using the consumer group names and the provider group names, wherein the intermediate mapping associates the first resource consumers with the first resource providers and associates the second resource consumers with the second resource providers, wherein the intermediate mapping is expressed as a set of flavors, and wherein the set of flavors includes application flavors, support flavors, and operating system flavors;

creating a new resource consumer to execute a program in the computing system, wherein creating includes assigning one of the consumer group names to the new resource consumer; and allocating a resource to the new resource consumer from one or more of the resource providers, wherein allocating includes matching the consumer group name assigned to the new resource consumer to an associated provider group name as defined by the intermediate mapping.

13. The method of claim 12, wherein the new resource consumer includes a first resource consumer and a second resource consumer, wherein allocating a resource to the new resource consumer includes:

allocating a first resource to the first resource consumer from the one or more of the first resource providers based on a determination that the consumer group name assigned to the first resource consumer matches the first provider group name; and allocating a second resource to the second resource consumer from the one or more of the second resource providers based on a determination that the consumer group name assigned to the second resource consumer matches the second provider group name.

14. The method of claim 12, wherein a first consumer group associated with the first consumer group name includes only application programs.

15. The method of claim 12, wherein a second consumer group associated with the second consumer group name includes only operating system (OS) programs.

16. The method of claim 12, further comprising:

dynamically changing the consumer group name assigned to the new resource consumer from one of the first and second consumer group names to the other.

* * * * *